Nov. 11, 1969     W. E. THORNTON     3,477,292
DIGITIZED CLINICAL THERMOMETER
Filed Nov. 6, 1967     2 Sheets-Sheet 1
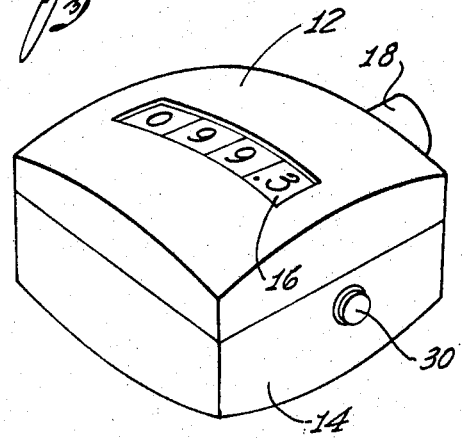
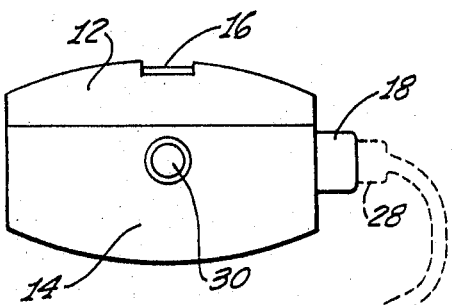
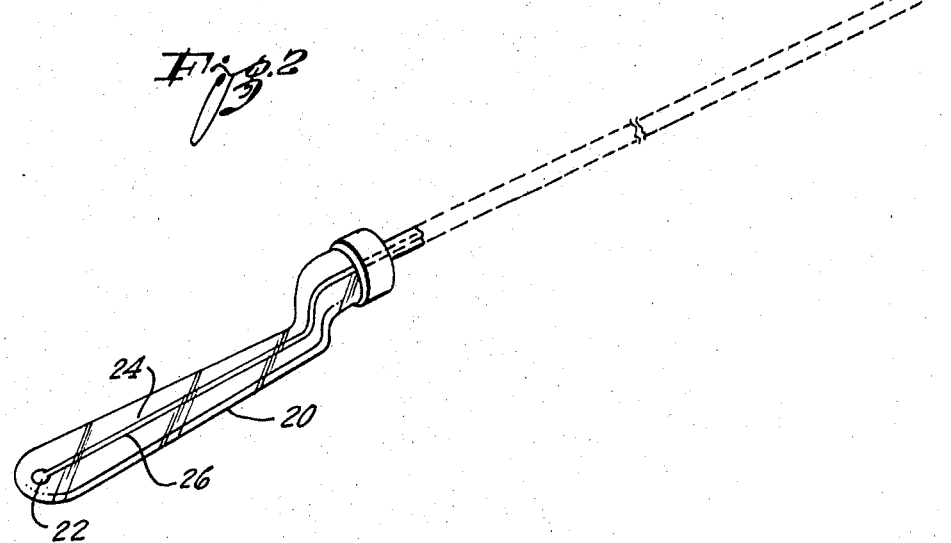
INVENTOR:
William E. Thornton
ATTORNEY United States Patent Office 3,477,292
Patented Nov. 11, 1969

3,477,292
DIGITIZED CLINICAL THERMOMETER
William E. Thornton, San Antonio, Tex.
(205 Echo Ave., Friendswood, Tex. 77546)
Filed Nov. 6, 1967, Ser. No. 680,716
Int. Cl. G01k 5/18
U.S. Cl. 73—362                                     3 Claims

ABSTRACT OF THE DISCLOSURE

An improved temperature measuring instrument having particular utility as a clinical thermometer. The instrument is of the electrical type, and it includes a digitizing circuit connected so that the number of pulses produced corresponds to the temperature being measured, and a pulse counting means connected to the digitizing circuit, with appropriate means to display the temperature directly as decimal numbers on the basis of the count.

Background of the invention

The usual fever, or clinical thermometer in widespread use today is made up of an elongated glass tube with a bulb formed at one end. The bulb is filled with mercury, for example, and the tube is calibrated, usually between 96° and 106° Fahrenheit. To measure the body temperature of a patient, the bulb end of the thermometer is inserted into his mouth or rectum, and the height to which the mercury rises in the tube gives the desired reading.

Although the prior art clinical thermometer described in the preceding paragraph has been generally satisfactory in performing its intended purpose and has been in use for many years, it is subject to inherent limitations and disadvantages. For example, there is an ever-present danger of breakage, especially in the case of children, while the mercury clinical thermometer is in the mouth or rectum of the patient. The resulting broken glass and free mercury from the broken thermometer can render serious bodily harm.

In addition, the piror art clinical thermometers, not only are excessively expensive due to their fragility and high breakage rate, but are also slow to react and somewhat difficult to read. Also, their fragile nature renders them difficult to store.

The temperature measuring instrument provided by the present invention is rugged in its construction, and is not subject to breakage, either while in use or when stored. In addition, the instrument is easy to use, easy to read; and it is extremely rapid, precise and accurate in its indication of the body temperature of the patient.

One or more probes may be provided in conjunction with the instrument of the invention, these being capable of being selectively plugged into socket means provided on the casing of the instrument. The probes each include a temperature-sensitive element, such as a thermistor, or other temperature-sensitive element, which varies in resistance in accordance with its temperature. The resistance variation of the temperature sensitive element in the probe, as the probe is inserted into the patient, or is otherwise used to measure a temperature level, controls the frequency or application of clock pulses to a pulse counter, so that the count of the counter corresponds exactly to the indicated temperature. The resultant count may be displayed directly by the counter, or it may be used to control any known type of read-out display device, such as the usual seven-bar incandescent lamps.

The probe in which the temperature-sensitive element is imbedded, may be formed, for example, of a flexible plastic material, such as polyethylene, so as to be virtually unbreakable. The probe may have any desired shape, so as to be suitable for insertion, for example, into the mouth or rectum of the patient; or for such other use as the temperature measuring instrument may be put.

Summary of the invention

A temperature measuring instrument is provided which includes, for example, a probe having a temperature-sensitive element therein, and which further includes a digitizing circuit coupled to the temperature-sensitive element. A pulse counter is also included in the instrument, and the digitizing circuit applies a number of pulses to the pulse counter corresponding to the temperature indicated by the temperature-sensitive element in the probe. The counter is coupled to an appropriate read-out display unit, so that its temperature indicating count may be read.

Brief description of the drawings

FIGURE 1 is a perspective view of one embodiment of the invention, showing a casing of a size which may be carried, for example, in the hand of the operator;

FIGURE 2 is a side elevational view of the unit of FIGURE 1, and also showing a probe coupled into the unit.

Detailed description of the illustrated embodiment

Figure 3:
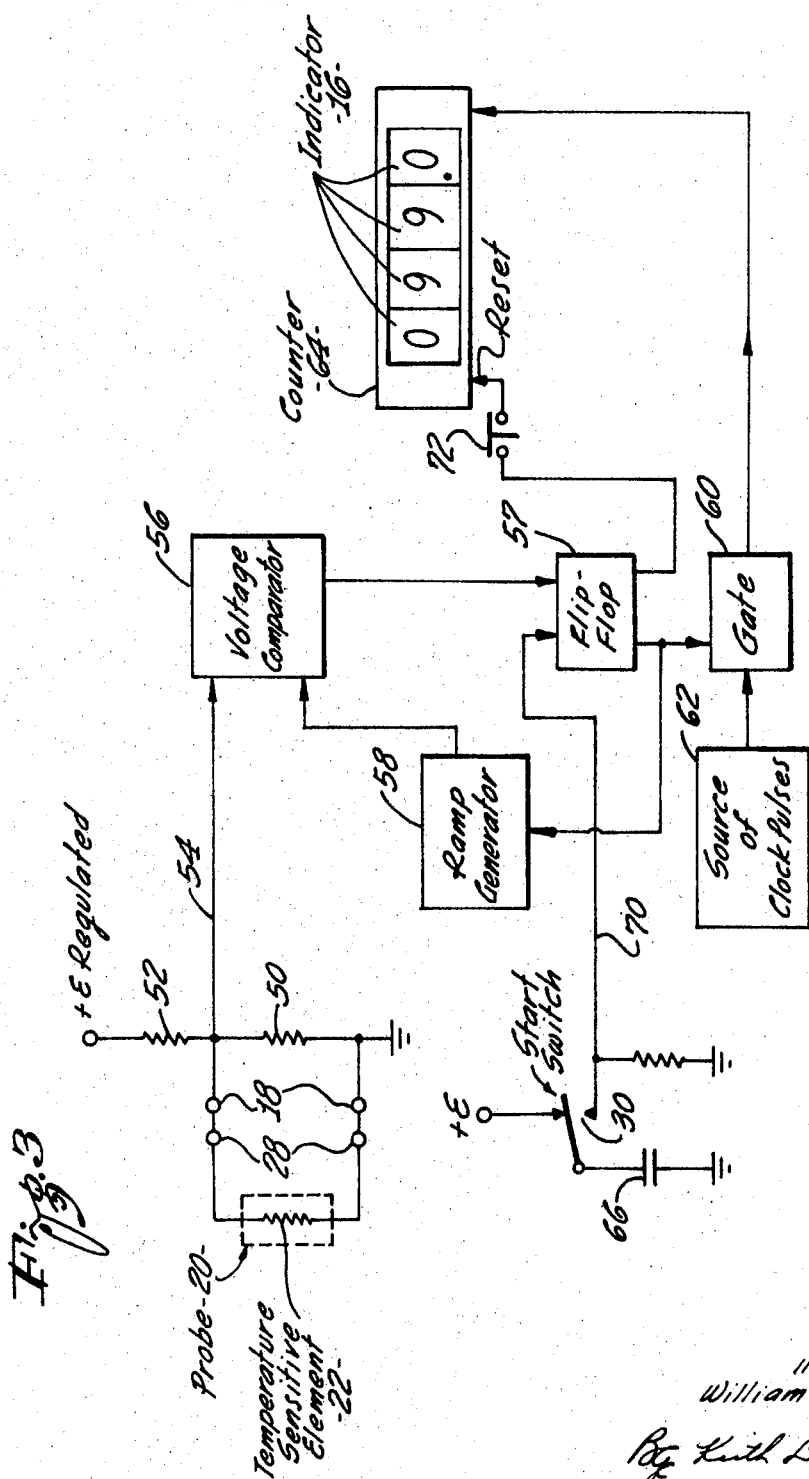
FIGURE 3 is a schematic diagram, partly in circuitry and partly in block form, showing the electrical system of one embodiment of the invention.

The illustrated embodiment of the invention includes a casing 10. As illustrated, the casing has a generally cylindrical configuration, and it may be of a size, weight, and contour so that it may be conveniently grasped in the hand of the operator. The casing 10 has an upper portion 12 and a lower portion 14, these two portions being held together, for example, by any appropriate known type of fastener means.

The upper portion 12 of the casing 10 includes a window which reveals the calibrated scale of a decimal type of read-out 16. As mentioned above, the read-out 16 may be an electrical type of read-out display, or it may be associated directly with the pulse counter in the unit. The read-out display 16 may be calibrated to display readings directly in degrees Fahrenheit.

An electrical socket 18 is also provided on the casing 10, and this socket has any suitable construction, so as to receive and provide electrical contact for probes, such as the probe 20 shown in FIGURE 2. The probe 20, for example, may be composed of a flat strip of flexible plastic material, such as polyethylene, of a shape and size so that it is suited to be inserted into the mouth of the patient, and under the tongue.

A temperature-sensitive thermistor element 22 is mounted within the probe 20, the temperature-sensitive element being formed of a small piece of temperature-sensitive material, and being mounted at the remote end of the probe. The temperature-sensitive material may, for example, be silicon carbide, since that material has the characteristic of exhibiting resistance variations in response to temperature changes. Of course, any other appropriate temperature-sensitive element may be included in the probe.

The element 22 is connected by a pair of leads 24 and 26 to a plug 28, so that connections may be made from the temperature-sensitive element 22 to the internal circuitry of the unit. A metal button may be provided at the end of the probe in contact with the element 22, so that the temperature of the patient may be conducted directly to the temperature-sensitive element. A push button switch 30 is provided on the side of the casing portion 14, and this switch is depressed, whenever a temperature reading is to be made.

It will be appreciated, therefore, that the instrument of the present invention is easy and convenient to use. It is merely necessary to plug the probe 20 into the casing, and to bring the probe into contact with the patient. Then, the push button switch 30 is actuated, and the temperature of the patient is immediately exhibited by the scale 16. The switch 30 may be provided with a back contact, so that when it is released, the scale 16 is reset to zero.

A schematic diagram of an appropriate electrical system for the unit of the invention is shown in FIGURE 3. As shown in FIGURE 3, the temperature-sensitive element 22 of the probe 20 is connected into the circuit of FIGURE 3, by plugging the plug 28 into the socket 18. This connection, in effect, places the temperature-sensitive element across a grounded resistor 50 which, together with an additional resistor 52, extend across a regulated direct current potential source E. The potential source E is regulated, so that the potential of a lead 54, which extends from the junction of the resistors 50 and 52 to a voltage comparator 56, varies only in response to variations in the resistance of the temperature-sensitive element 22.

A ramp generator circuit 58 is also connected to the voltage comparator 56. The ramp generator and voltage comparator are well known circuits, and need not be described in circuit detail. Specifically, the ramp generator 58, upon being triggered by an input signal, produces a linearly increasing output signal; and the voltage comparator 56 produces an output when the linearly increasing output signal from the ramp generator 58 coincides with the potential of the lead 54.

The output from the voltage comparator is used to reset a flip-flop 57 which, in turn, disables a gate 60. A source of clock pulses 62 is coupled to the gate 60. These clock pulses are passed to a counter 64 whenever the gate is enabled, and are interrupted when the gate is disabled. The start switch 30 has a normally-closed contact which connects a grounded capacitor 66 to the positive terminal of the source E, and it has a normally-open contact. When the switch 30 is actuated, the normally-open contact closes and the capacitor 66 is caused to discharge through a grounded resistor 68. The resulting pulse on the lead 70 is used to set the flip-flop 57. When the flip-flop 57 is set, the gate 60 is enabled, and simultaneously, the ramp generator 58 is actuated so as to start the generation of its ramp output. So long as the gate 60 is enabled, pulses from the source 62 are applied to the counter 64 to be counted thereby.

The flip-flop 57, the gate 60, as well as the source of clock pulses 62 may be of any known type, which are well understood in the art, and likewise need not be described in circuit detail. The counter 64 may be any known type of decade counter, for example, and it may be capable either of directly displaying its count, so as to constitute the indicator 16, or to control an incandescent display read-out unit, as mentioned above, which then constitutes the indicator 16. The reset output terminal of the flip-flop 57 may be connected through a reset switch 72 to the reset control of the counter 64. As mentioned above, the reset switch 72 may, if desired, be a back contact on the start switch 30.

It will be appreciated, therefore, that when the probe 20 is inserted, for example, into the mouth of a patient to make a temperature reading, the temperature-sensitive element then assumes a particular resistance value corresponding precisely to that reading; and the lead 54 assumes a potential value likewise corresponding precisely to the temperature reading.

Then, when the start switch 30 is depressed, the resulting pulse from the capacitor 66 sets the flip-flop 57 which, in turn, starts the ramp generator 58 and enables the gate 60. The source of clock pulses 62 now introduces pulses to the counter 64, and these pulses are counted by the counter. The counting continues until the ramp from the ramp generator 58 corresponds with the potential value of the lead 54, at which time the voltage comparator 56 resets the flip-flop 57 and disables the gate 60. This latter action interrupts the application of pulses to the counter 64, and the count of the counter, as displayed by the indicator 16 is a representation of its total count.

The system may be calibrated so that the indicator 16 displays readings directly in degrees Fahrenheit. This calibration may be achieved, for example, by controlling the frequency of the pulses from the clock source 62, or the value of the resistors 50 and 52, as the instrument is measured against a standard range of temperatures. At the end of the reading, the switch 72 may be depressed to reset the counter 64 and the indicator 16 to zero, at which time the system is ready for the next reading.

As an alternative, the temperature-sensitive element 22 of the probe 20 may be used to control the frequency of the pulses from the source 62, so that the indicated temperature would depend upon the number of pulses applied to the indicator 16 during a fixed time interval.

The invention provides, therefore, an improved temperature measuring unit, which is relatively inexpensive, yet is rugged in its construction, and rapid and precise in its operation.

While a particular embodiment of the invention has been described, modifications may be made.

What is claimed is:

1. A temperature sensitive instrument for measuring the body temperature of a patient, and for other temperature measuring purposes, including: a casing; a probe; a temperature sensitive electrical resistive element mounted in said probe and exhibiting resistance values indicative of the temperature of the probe; read-out means mounted in said casing for displaying temperature values corresponding to the temperature of said probe and including a pulse counter; a source of clock pulses included in said casing, and a gate circuit interposed between said source and said pulse counter for controlling the number of clock pulses applied to said counter from said source; a voltage comparator circuit included in said casing; electrical circuitry connecting said temperature sensitive element in said probe to said voltage comparator circuit for applying a voltage to said voltage comparator circuit having a value determined by the resistance of said temperature sensitive resistive element in said probe and representative of the temperature of said probe; ramp generator circuitry connected to said voltage comparator circuit for applying a varying voltage to said voltage comparator circuit; and a control circuit for enabling said gate circuit and for simultaneously activating said ramp generator circuitry, said control circuit responding to a voltage comparison indication from said voltage comparator circuit to disable said gate circuit after a time interval established by the resistance value of said temperature sensitive electrical element in said probe.

2. The temperature sensitive instrument defined in claim 1 and which includes a manually operated start switch in said control circuit.

3. The temperature sensitive instrument defined in claim 1 in which said counter comprises a decade counter and a decimal indicator read-out device coupled to said decade counter.

References Cited

UNITED STATES PATENTS 3,221,555 12/1965 Biber.
3,274,832 9/1966 Hamilton _____ 73—355 XR

OTHER REFERENCES

Quartz Thermometers, models 2800A and 2801A, Hewlett Packard Co. catalog, Dec. 3, 1965, pp. 1–6.

LOUIS R. PRINCE, Primary Examiner

FREDERICK SHOON, Assistant Examiner